United States Patent
Gurusami et al.

[11] Patent Number: 6,031,846
[45] Date of Patent: Feb. 29, 2000

[54] METHOD AND APPARATUS FOR IMPROVED TIME DIVISION MULTIPLE ACCESS (TDMA) COMMUNICATION

[75] Inventors: Aravanan Gurusami, East Syracuse; Mike Nekhamkin, De Witt; R. Gary Heyman, East Syracuse, all of N.Y.

[73] Assignee: Philips Electronics North America Corp., New York, N.Y.

[21] Appl. No.: 08/761,573

[22] Filed: Dec. 6, 1996

[51] Int. Cl.[7] .................................. H04L 7/10; H04J 3/06
[52] U.S. Cl. ........................ 370/508; 370/519; 375/356
[58] Field of Search ................................. 370/442, 443, 370/458, 461, 498, 500, 503, 504, 508, 522, 324, 350, 516, 517, 519; 375/356, 358, 362, 371; 455/3.1, 5.1, 6.1, 6.2, 6.3; 348/6, 7, 8, 9, 10, 11, 12, 13, 500, 525, 526

[56] References Cited

U.S. PATENT DOCUMENTS

| | | | |
|---|---|---|---|
| 4,472,802 | 9/1984 | Pin et al. ................................ | 370/104 |
| 5,173,899 | 12/1992 | Ballance .................................. | 370/503 |
| 5,533,028 | 7/1996 | Hita De La Torre et al. .......... | 370/347 |
| 5,579,321 | 11/1996 | Van Grinsven et al. ............... | 370/442 |
| 5,606,555 | 2/1997 | Singer .................................... | 370/465 |
| 5,642,355 | 6/1997 | Smith ..................................... | 370/337 |
| 5,712,982 | 1/1998 | Marcel .............................. | 395/200.17 |
| 5,719,858 | 2/1998 | Moore .................................... | 370/347 |

*Primary Examiner*—William Luther
*Attorney, Agent, or Firm*—Gregory L. Thorne

[57] ABSTRACT

An improved method for Time Division Multiple Access (TDMA) communications particularly applicable to a network comprising transmitters having significantly different transmission paths to a common receiver. The common receiver measures the response time from each transmitter, relative to a common time reference, then instructs each transmitter to delay all subsequent responses by an amount specific to each transmitter, as determined from these measured response times. This imposed delay results in a more time efficient TDMA protocol, improved error detection capability, and improved security capabilities. This invention is particularly applicable to bi-directional communications to and from a provider of Cable TV, Telephony, and Data Services.

4 Claims, 10 Drawing Sheets

FIG.10

METHOD AND APPARATUS FOR IMPROVED TIME DIVISION MULTIPLE ACCESS (TDMA) COMMUNICATION

BACKGROUND OF THE INVENTION

1. Field of the Invention

This invention generally relates to signal transmission and processing, and specifically to a method and apparatus for providing efficient telephone and data service to Cable TV subscribers through the use of an improved method of Time Division Multiple Access (TDMA) communications.

2. Discussion of the Related Art

Cable Antenna Television (CATV) Networks provide an established network infrastructure for high speed communications. Traditionally, CATV networks operate solely as broadcast networks. Information, in the form of television programs, is transferred one way, from the CATV headend to the CATV subscribers. With the advent of advanced technologies and changes in the regulatory restrictions, CATV network operators have an opportunity to use their network infrastructure to provide additional services to their subscribers (see FIG. 1). These services will include, for example, telephone service, internet access, video on demand, etc. These additional services will require the networks to handle high speed, high bandwidth communications both to and from the subscriber, and, to be successful, will be required to be highly robust and reliable.

CATV networks differ from other high bandwidth networks. High bandwidth cable and fiber networks are employed for a variety of data communication systems, but such systems are typically characterized as being relatively close geographically, e.g. Local Area Networks (LANs). CATV networks often span large geographic regions, and an effective CATV network must accommodate subscriber locations with significantly different transmission paths to the CATV headend.

Consider, for example, attempting to synchronize the transmission of information from a variety of subscriber locations. A common technique for communications from multiple sources is Time Division Multiple Access (TDMA), wherein each transmitter is assigned a time slot relative to a synchronizing timing signal sent from the receiver. It is imperative in TDMA that the communications from these multiple sources do not overlap in time. A sufficient gap between assigned time slots must be allowed to accommodate any variances in the timings of the signals from the various transmitters. This gap between time slots is a significant factor in the determination of the overhead, or inefficiency, of a TDMA network. The inefficiency can be measured as the ratio of the gap time to the slot time. If each transmitter is allocated a relatively long slot time, then long gap times can be tolerated. However, a long slot time per transmitter results in a long interval between slot times for each transmitter. Long periods of time between transmissions increases the cost of memory to buffer the data between transmissions, and, in some application, such as voice, can cause intolerable delays. Thus, short and frequent slots are preferred to long and infrequent slots, albeit at the cost of decreased efficiency caused by gap times.

In most high speed networks, the variance among the transmitters, and hence the gap time, can be controlled to be less than a few microseconds. However, in a typical CATV network, the source transmitters are located at various geographic locations relative to the cable headend location. It would not be unusual, for example, to have one subscriber located within a mile of the headend, and another located twenty or more miles away from the headend. At a typical speed of transmission of 125,000 miles per second over a fiber optic cable, it would take a signal over 160 microseconds to reach a device located twenty miles away, and less than 8 microsecond to reach a device one mile away. Thus, the synchronizing timing signal received by each of these transmitters would have a variance of over 150 microseconds. Additionally, this variance in time would be incurred for signals transmitted back to the headend, such that the variance between signals from devices located twenty miles apart for a round trip transmission would amount to over 300 microseconds. The time slot allocated for each source transmitter in this environment would necessarily be set to be at least 300 microseconds, to allow for these variances (see FIG. 7). Even if a 300 microsecond gap time could be tolerated, however, setting the time slot to this specific gap time will limit the geographic extent of the CATV network to the aforementioned twenty miles, thereby limiting the growth of such a network to this predetermined distance. To avoid such a constraint, the time slot per transmitter would be specified at some maximum value, corresponding to the variance to be expected at the maximum predictable extent of the network. This maximum value would also include an allowance for the actual cable length and routing between locations, rather than the geographic distance. It would not be unreasonable in a typical CATV environment to specify a 500 microsecond or more time slot for each transmitter to accommodate the variance in transmission delay time among transmitters. Such an extensive time slot, relative to a short message length, will result in a very inefficient, or very costly, TDMA network. Shorter time slots, absent this invention, would require additional headends and geographically smaller networks.

SUMMARY OF THE INVENTION

This invention discloses the "ranging" of downstream transmitters. Ranging is accomplished via commands from the CATV headend to each individual transmitter. Each transmitter has the ability to delay its response, relative to a time reference. The commands from the CATV headend dynamically adjust each transmitter's delay time such that the messages received from each transmitter are aligned in a TDMA structure with minimal gap time. By ranging all transmitters, the precise location of the packet, in the time domain, can be stipulated, independent of the distance of the transmitter from the receiver. The use of ranging allows for optimized transmissions, improved error detection, and increased security.

DETAILED DESCRIPTION OF THE PREFERRED EMBODIMENT OF THE INVENTION

Figure 1:
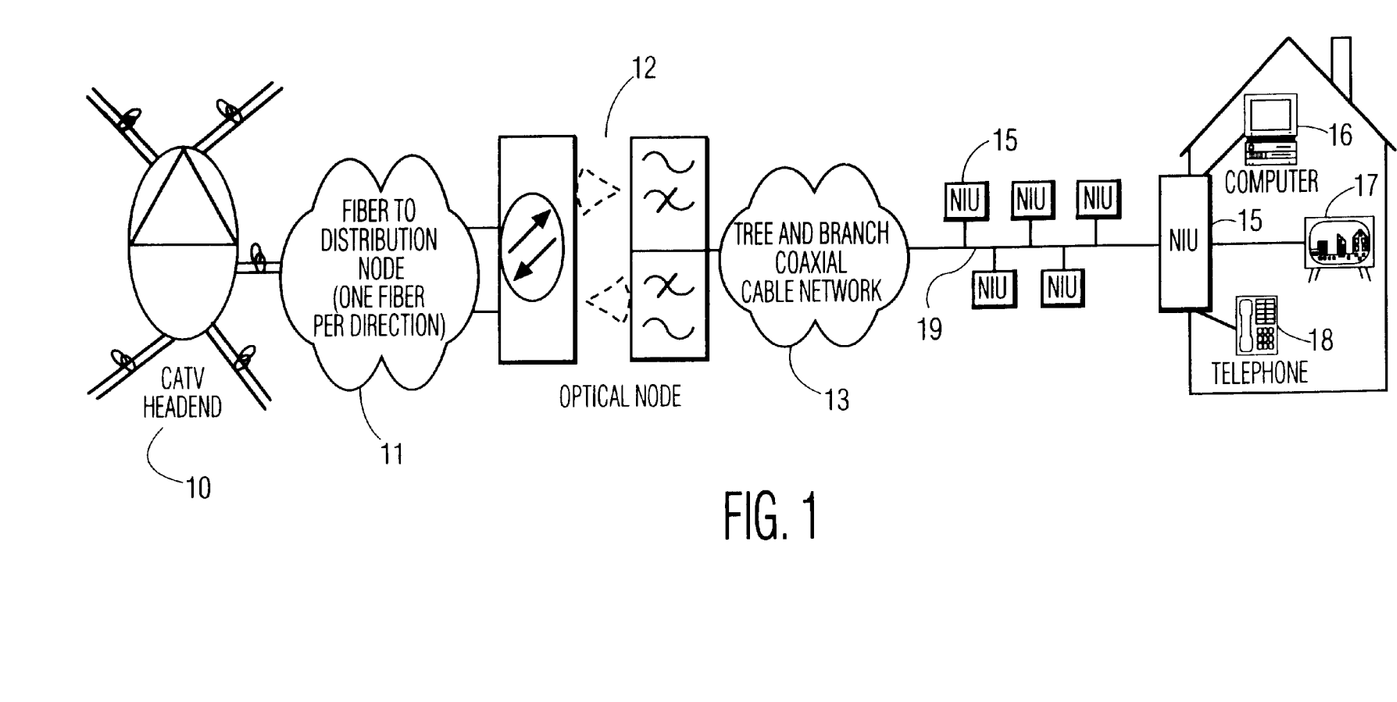
FIG. 1 shows a Bidirectional CATV Network.

FIG. 1 shows a Bidirectional Cable Television (CATV) network for providing television, telephony, and data services to a subscriber. The CATV Headend 10 is the distribution center for all communications to and from the subscriber. At the CATV Headend would be the interfaces, not shown, to the telephone service provider(s), the data service provider(s), as well as the television service provider(s). In an exemplary configuration, the CATV Headend 10 transmits information over fiber-optic cables 11, one fiber for downstream (transmit) communications, and one fiber for upstream (receive) communications. At a local substation, the optical communication is converted 12 to electronic signals, and vice versa. The electronic signals are communicated over a coaxial cable network 13. Multiple Network Interface Units (NIUs) 15 are connected to a branch of this cable network. Typically, there would be one NIU per subscriber residence. Each NIU 15 provides the necessary interface to the subscriber's television 17, telephone 18, and computer 16. This invention addresses the equipment required at the CATV Headend 10 and the NIUs 15 to effectively and efficiently provide the bidirectional data 16 and telephony 18 services to the subscriber.

Figure 2:
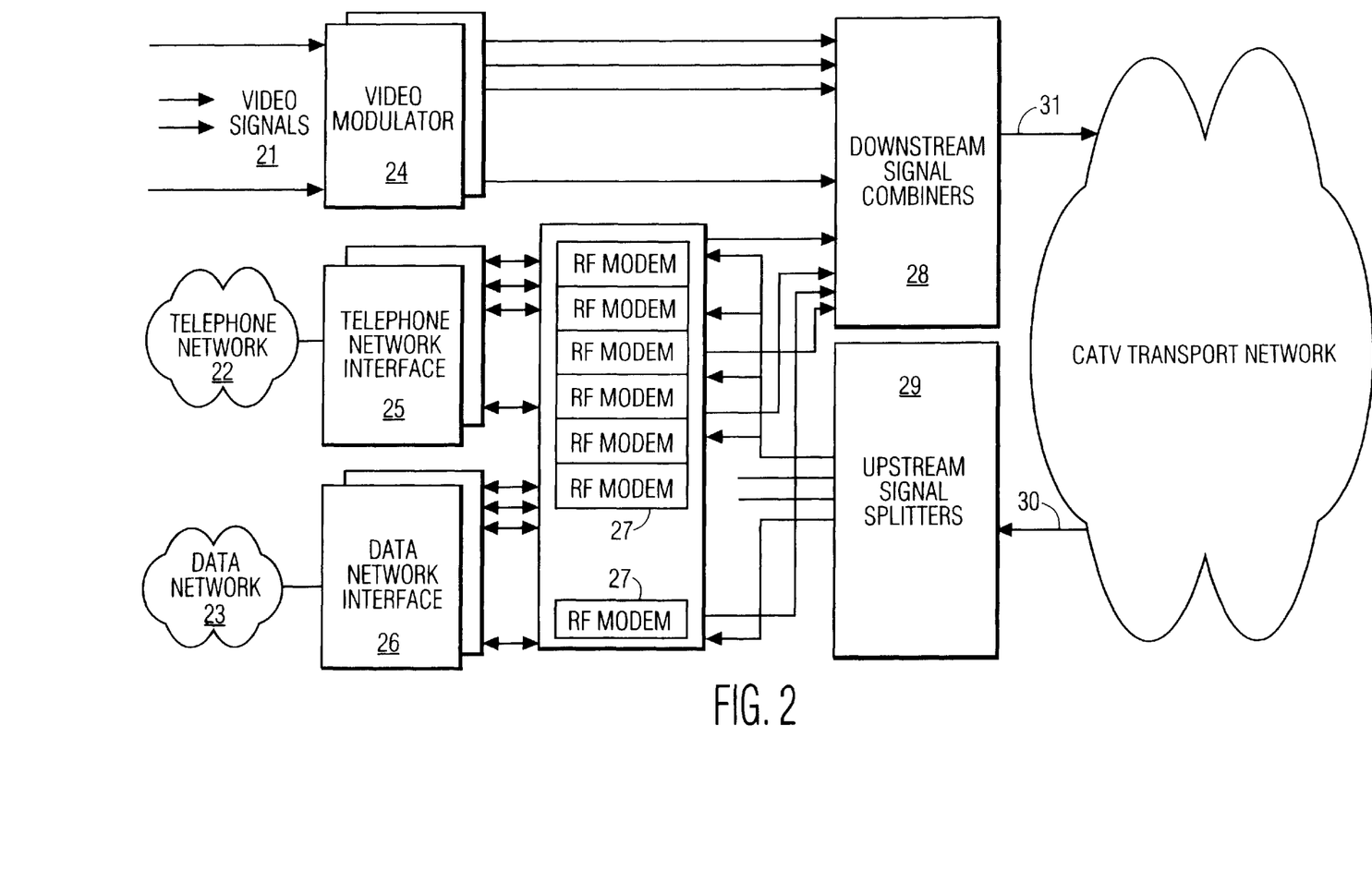
FIG. 2 shows a CATV Headend for Bidirectional Services.

The CATV Headend components are shown in FIG. 2. The CATV Headend comprises the video modulator 24 for the television/video signals 21, the interface 25 to the telephone network 22, and the interface 26 to the data network 23. The telephone and data signals are modulated and demodulated in the RF Modems 27. The modulated signals, from the video modulator 24 and the RF Modems 27 are combined 28 to form a frequency multiplexed downstream signal 31. The upstream signal 30, which is also frequency multiplexed, is demultiplexed at splitter 29 into individual signals for demodulation by the appropriate RF Modem 27. Each RF modem 27 is assigned a transmit, downstream, frequency and a receive, upstream, frequency.

Figure 3:
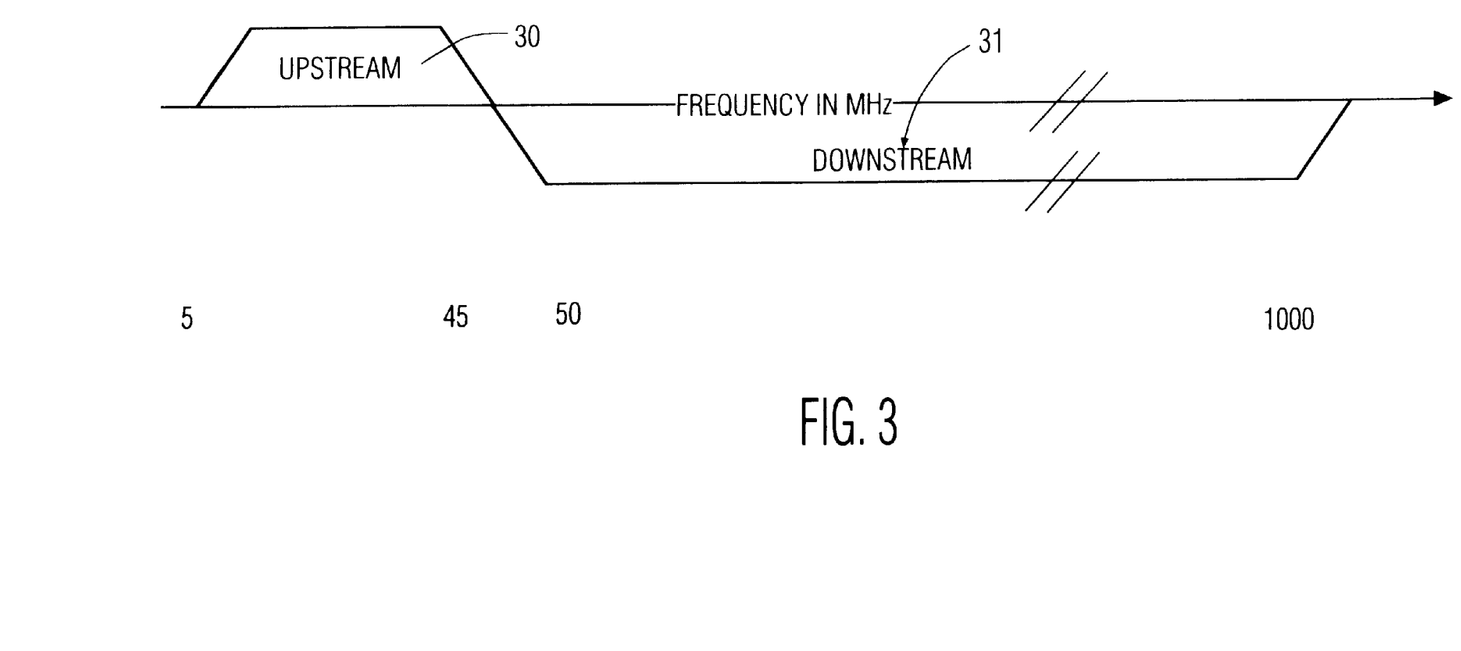
FIG. 3 shows the RF Spectrum Usage for a Bidirectional CATV Network.

The frequency allocation for upstream and downstream communication is shown in FIG. 3. The upstream signal 30, which is the frequency multiplexed combination of all the subscribers, upstream telephony and data communication, occupies the 5 MHz to 50 MHz band. The downstream signal 31, which is the frequency multiplexed combination of the television/video signals as well as the subscribers' downstream telephony and data communications, occupies the 50 MHz to 1000 MHz band.

Figure 4:
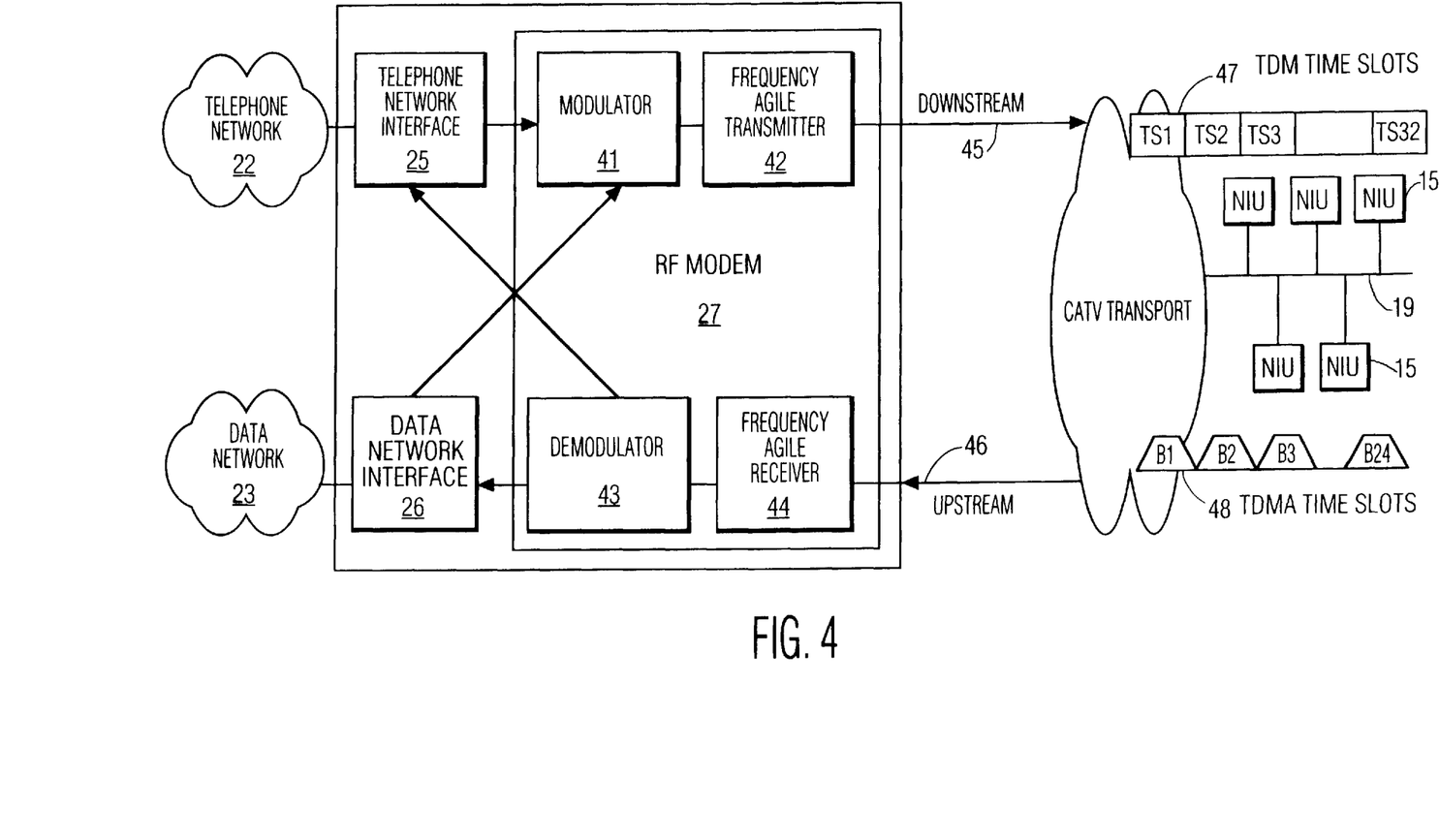
FIG. 4 shows the use of Time Division Multiplexing (TDM) and Time Division Multiple Access (TDMA) for Downstream and Upstream communication, respectively, in a Bidirectional CATV Network.
Figure 5:
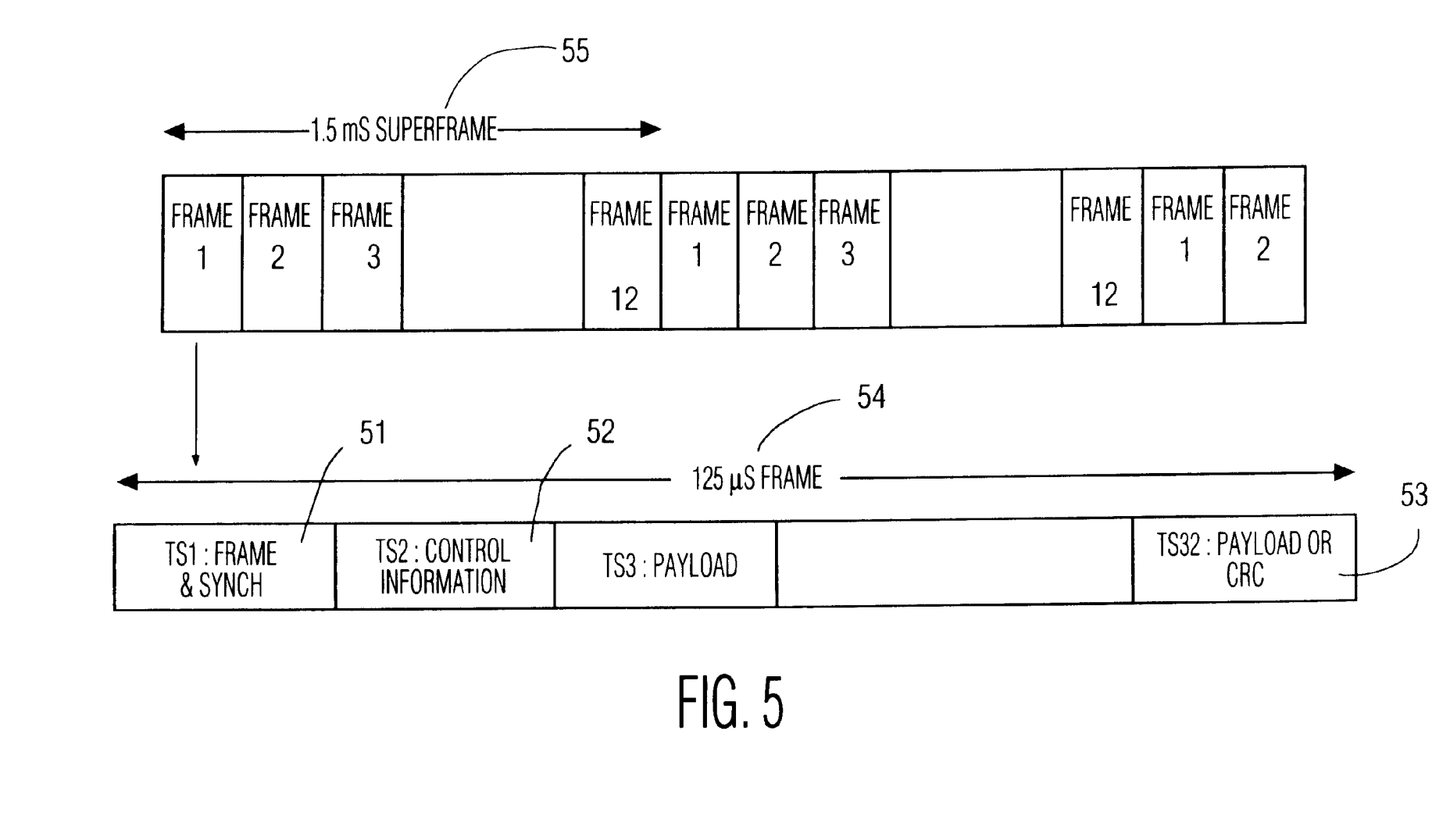
FIG. 5 shows the structure of the Downstream TDM transmission stream.

Within the frequency multiplexed downstream signal 31 and upstream signal 30, the telephone and data signals are further multiplexed in the time domain, as shown in FIG. 4. Shown in FIG. 4 is the RF Modem 27 of FIG. 2, comprising a modulator 41, a radio frequency transmitter 42 and receiver 44, and a demodulator 43. The downstream signal 45 is one of the signals comprising the frequency multiplexed downstream signal 31, and the upstream signal 46 is one of the signals comprising the frequency multiplexed upstream signal 30. The downstream signal 45 is delineated into thirty two time slots 47. Each NIU 15 is assigned one or more of these time slots. The assignment can be static, wherein the assignment does not change, or dynamic, wherein the assignment of a time slot to an NIU is dependent upon the demand for service from each NIU. As shown in FIG. 5, the first time slot 51 is assigned for timing and synchronization. The second time slot 52 contains control information, and this control information could contain the signalling for the dynamic assignment of subsequent time slots to each NIU. The last time slot 53 can be assigned for error correction signalling. In the preferred embodiment, the 32 time slots comprise a 125 microsecond frame period 54. Twelve frame periods form a 1.5 millisecond superframe 55. The downstream superframe also forms a timing sequence for the upstream communication as discussed below.

Figure 7:
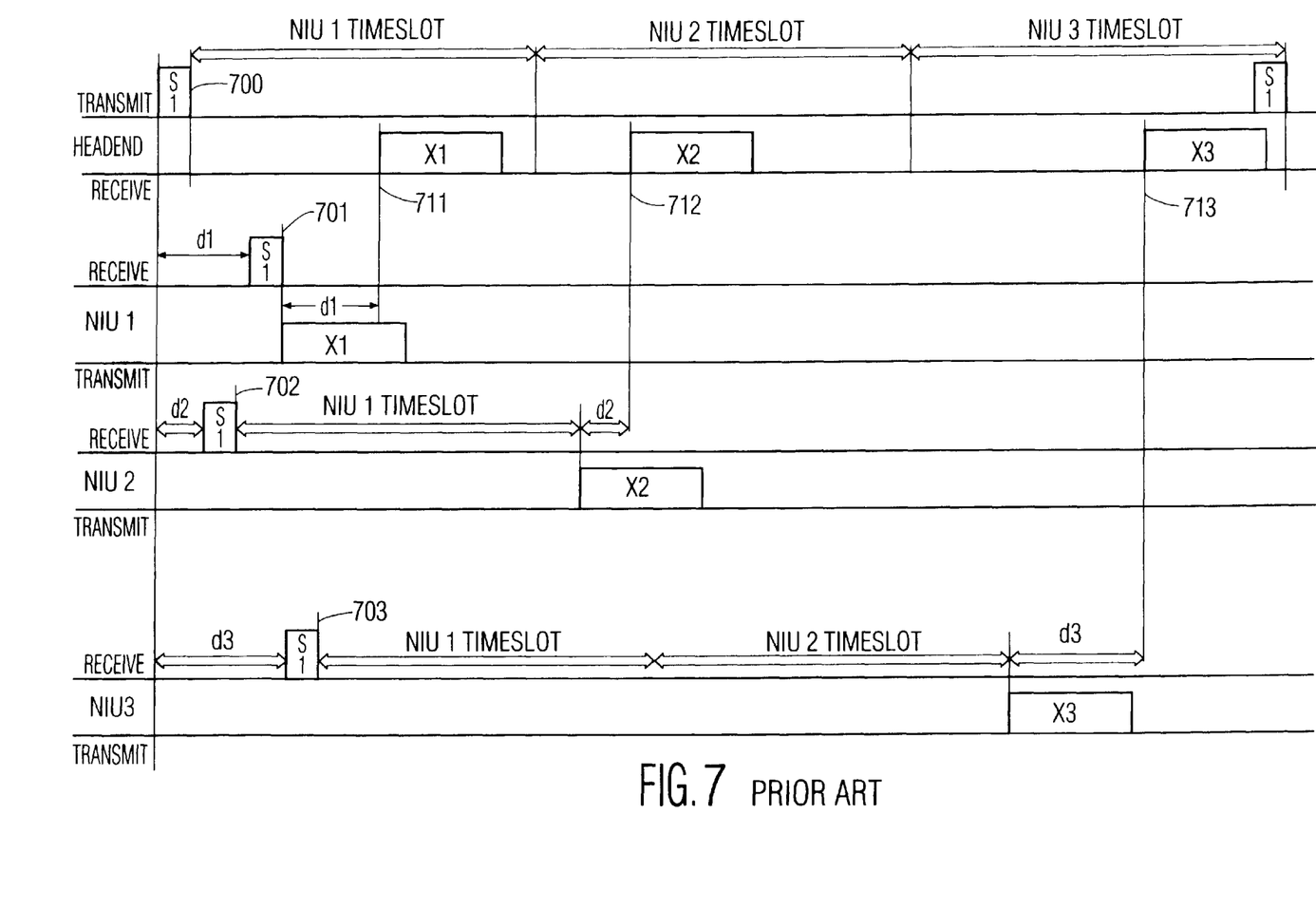
FIG. 7 shows a TDMA timing sequence absent this invention.

Shown in FIG. 7 is a traditional TDMA timing sequence. The CATV headend transmits a synchronization pattern S1 to establish a time reference 700. From this time reference, the subsequent time is partitioned into timeslots for each NIU. Each transmitter is responsible for transmitting its message within its allocated timeslot. In a traditional network, the delay time from the transmission of the synchronization signal to its receipt at the NIU would be minimal, or would be similar among NIUs. Shown in FIG. 7, however, is a delay d1 associated with NIU 1, a delay d2 associated with NIU 2, and a delay d3 associated with NIU 3. The predominant cause of this delay, in a CATV environment, is the physical cable distance from the headend to the individual subscriber. NIU 2, in this example, is closest to the headend, while NIU 3 is furthest from the headend. The synchronization signal S1 arrives at NIU 1 after a delay of d1. NIU 1 uses this synchronization signal to establish a time reference 701, which, because of delay d1, is not equivalent to time reference 700. Similarly, because of delay d2, NIU 2's time reference is established at 702, which is different from both 700 and 701. Likewise, NIU 3's time reference 703 is different than 700, 701, and 702.

NIU 1, being assigned the first time slot, transmits its message X1 immediately after time reference 701. Due to delay d1, the message arrives at the headend at time 711. NIU 2, being assigned the second time slot, waits for the duration of NIU 1's timeslot before transmitting its message X2. After time delay d2, it arrives at the headend at time 712. NIU 3 waits for both NIU 1 and NIU 2's time slots, then transmits its message X3, which arrives at the headend at time 713.

Note that the traditional TDMA protocol of FIG. 7 allocated sufficiently long timeslots to accommodate the variance of delay times among the NIUs. Had the time slots been significantly shorter, X2 might have arrived at the headend before, or during, X1's arrival, because NIU 2 has a significantly shorter delay time compared to NIU 1. Note, however, that by providing for a sufficiently long timeslot, the gaps between messages are long, resulting in a very inefficient use of the time domain.

Figure 8:
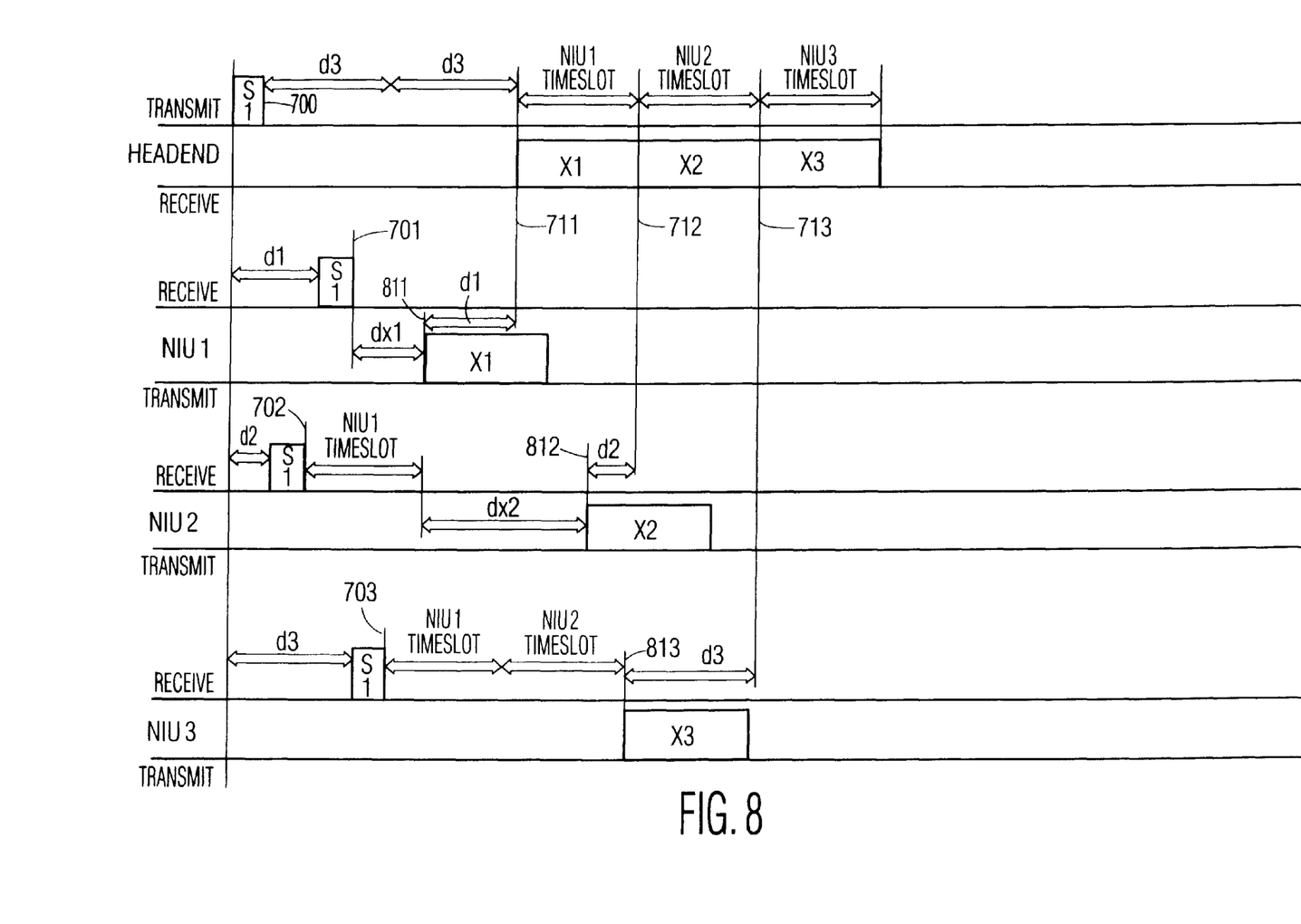
FIG. 8 shows a TDMA timing sequence in accordance with this invention.

FIG. 8 shows a modified TDMA protocol in accordance with this invention which optimizes the use of the time domain by minimizing the gap between messages. This invention accommodates for the farthest NIU, the one with the longest delay, then adjusts the transmission time of all other NIUs to form a stream of messages with minimal gaps between messages. From the reference time 700, a initial delay, equal to twice the longest NIU delay (corresponding to one round trip delay, to and from the NIU) is allocated before the allocation of timeslots for each NIU. The time of arrival of message X1 from NIU 1, corresponding to time 711 of FIG. 7, is specified to be immediately after this initial delay. In order to have the message from NIU 1 arrive at time 711, it must be transmitted from NIU 1 at time 811, which is d1 time units prior to time 711. The timeslot for each NIU is allocated to be substantially equal to the message length, thus, the message from NIU 2 is specified to arrive immediately after the completion of message X1 from NIU 1, at time 712. In order to have NIU 2's message arrive at time 712, it must be transmitted from NIU 2 at time 812, which is d2 time units prior to 712. Similarly, NIU 3's message must arrive at time 713, and must be sent d3 time units before 713, at time 813. Since the time from time reference 700 to time 713 is equal to the two timeslots plus the round trip time to NIU 3, NIU 3 must transmit its signal immediately following the two timeslots beyond its time reference 703, at time 813, as shown in FIG. 8. NIU 1 must wait for a period dx1, relative to its time reference 701, to transmit its message at time 811. Similarly, NIU 2 must wait a period dx2, relative to its time reference 702, to transmit its message at time 812.

By establishing periods dx1 and dx2, the packets will be received at the headend at the specified times, independent of the distance of the NIU from the headend, thereby allowing for minimal gaps between messages. The period between synchronizing signal S1 and the NIU timeslots need not be set to precisely the longest round trip delay time. It should be at least as great as the longest round trip delay time, to allow the NIU with this longest delay to respond in time, in the event that this NIU is assigned the first timeslot and must respond immediately after receiving the synchronizing signal S1. Assigning a longer delay time between S1 and the NIU timeslots would merely mean that dx1 and dx2 would be longer, and a corresponding dx3 delay would be incurred by NIU 3 in the example of FIG. 8. Assigning a shorter delay would merely mean that NIUs with round trip delays shorter than this delay would be precluded from using the timeslot(s) immediately following S1.

Figure 9:
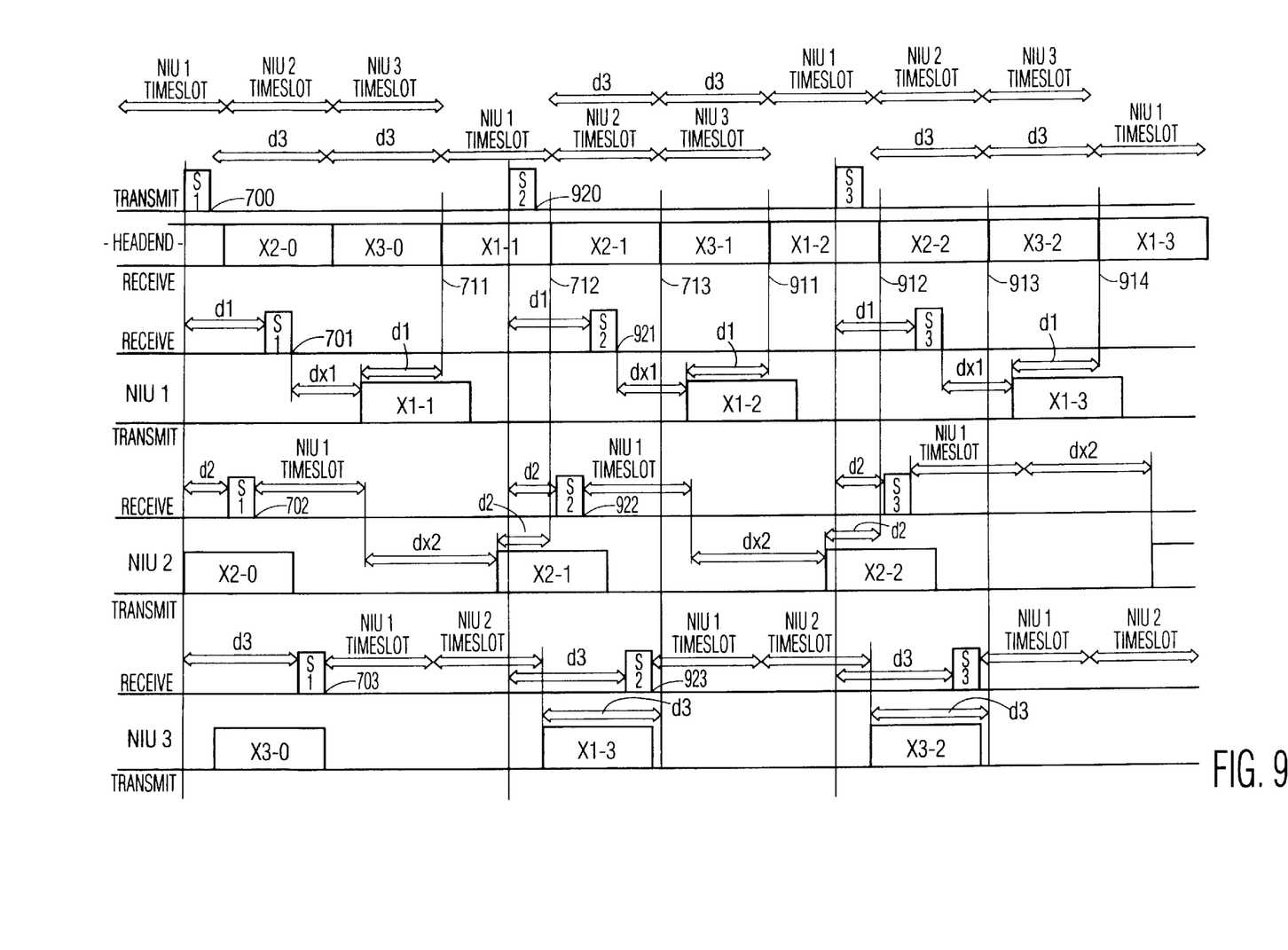
FIG. 9 shows an optimized TDMA timing sequence in accordance with this invention.

Although the total time, from S1 to time 713 is equivalent between FIGS. 7 and 8, note that the interval between the synchronizing signal S1 and the NIU timeslots is fixed, and void of information. Messages can be transmitted during this period without fear of collision with the message group comprising X1, X2, and X3. FIG. 9 demonstrates the continuous transmission of messages without gaps between messages or message groups. Shown in FIG. 9 is a synchronizing signal S1, followed by synchronizing signals S2 and S3. S1, as in FIGS. 7 and 8, establishes time references 700, 701, 702 and 703. NIU 1, after a period dx1, transmits message X1-1, which arrives at the headend at time 711. As discussed above, the messages from NIU 2 (X2-1) and NIU 3 (X3-1) arrive at times 712 and 713. S2 establishes time references 920, 921, 922, and 923. After a period dx1 from time 921, NIU 1 transmits its next message, X1-2, which arrives at the headend at time 911, immediately after the last transmission from NIU 3, X3-1. As can be seen, the time of transmission of S2 from the headend can be specified to assure that time 911 immediately follows the receipt of X3-1 by specifying S2 to occur three timeslot intervals after S1. Similarly, S3 is transmitted three timeslots after S2, and so on.

Note that this protocol will be effective if and only if the NIUs wait the appropriate time period before transmitting. NIU 1 must wait for dx1 time periods, NIU 2 for dx2 time periods, and NIU 3 for zero time periods. Disclosed herein is an effective method of establishing these delay periods.

As noted above, and as shown in FIG. 5, the CATV headend transmission scheme includes both a synchronizing pattern and control information. The first time slot 51 of the transmitted information from the headend is assigned for timing and synchronization. The second time slot 52 contains control information. In accordance with the preferred embodiment of this invention, this control information will include a set of commands which will effect the determination of the required delay periods for each NIU on the network. One such command will be a SET_DELAY(I, X) command. Upon receipt of this command, the NIU whose address is I will set its delay parameter to X. Another command in this set is XMIT_NOW(I). Upon receipt of this command, which all NIU's on the net receive, the NIU whose address is I will send a message to the CATV headend, and all others will not transmit. NIU-I will transmit the message after the delay time contained in its delay parameter (previously set by the SET_DELAY command), but without waiting for its assigned timeslot. That is, in FIG. 8, NIU 2, upon receipt of an XMIT_NOW(2) command after a SET_DELAY(2, dx2) command, will not wait for NIU 1's timeslot as shown, but will transmit dx2 time units after time reference 702. With these commands, the establishment of the required delay times is straightforward, as detailed in FIG. 10.

Figure 10:
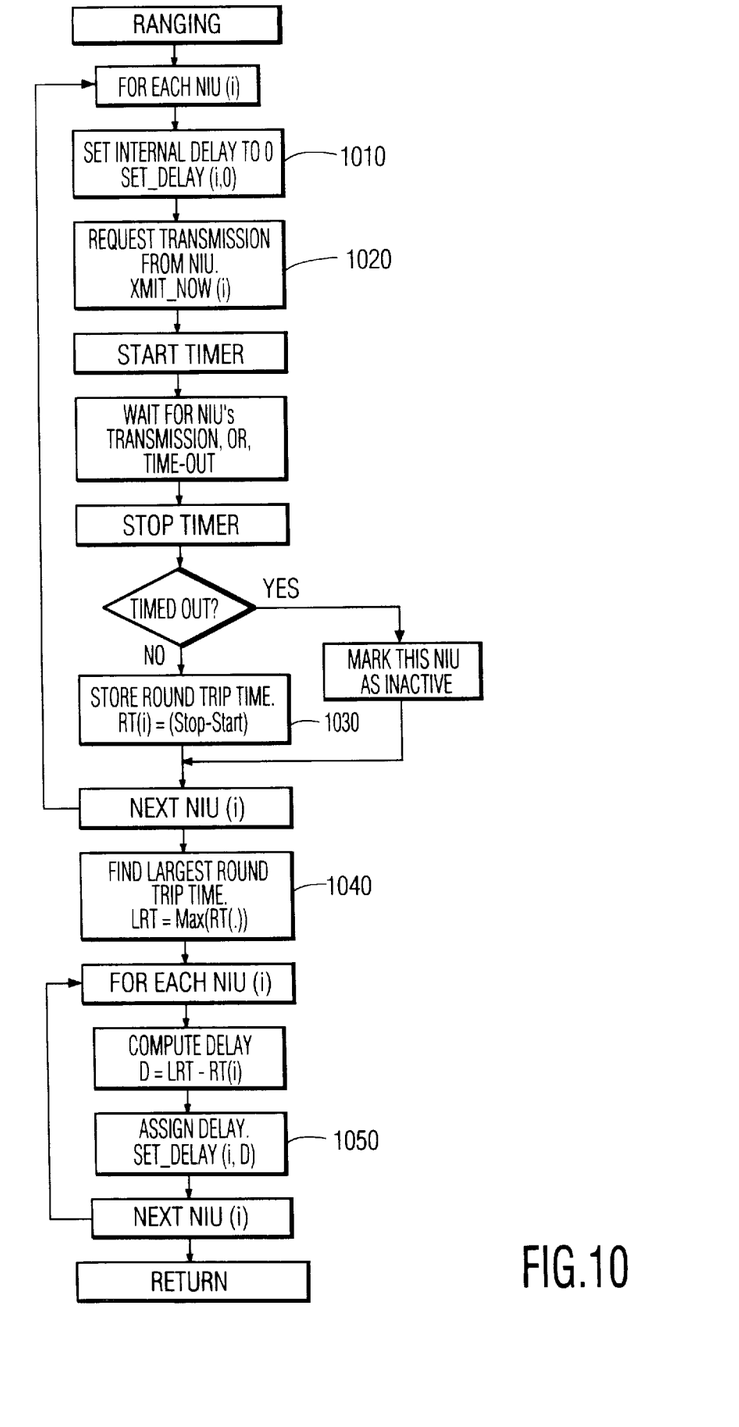
FIG. 10 shows a flowchart for adjusting the transmission delay times of each NIU in a network.

As shown in FIG. 10, the CATV headend transmits a SET_DELAY(i,o) to each NIU at box 1010. It subsequently transmits an XMIT_NOW(i) at box 1020, and measures the time for the NIU to respond 1030. This time is the total time for the signal to get to the NIU, be decoded by the NIU, and a message transmitted and received back at the headend. It should be noted that the NIU-specific decoding and response time will be contained in these measured times. This total time is referred to as the round-trip time for each NIU. The largest round trip time is noted 1040. Based on this largest round trip time, the required delay can be calculated as the difference between the largest round trip time and the round trip time associated with each NIU. Each NIU is commanded to set its delay to this calculated delay 1050. In so doing, the variance among devices caused by differences in distance from the CATV headend, as well as differences among the NIU-specific decoding and response times, will be nullified with respect to the CATV headend, thereby allowing the protocol to be set with minimal gap time between messages.

Figure 6:
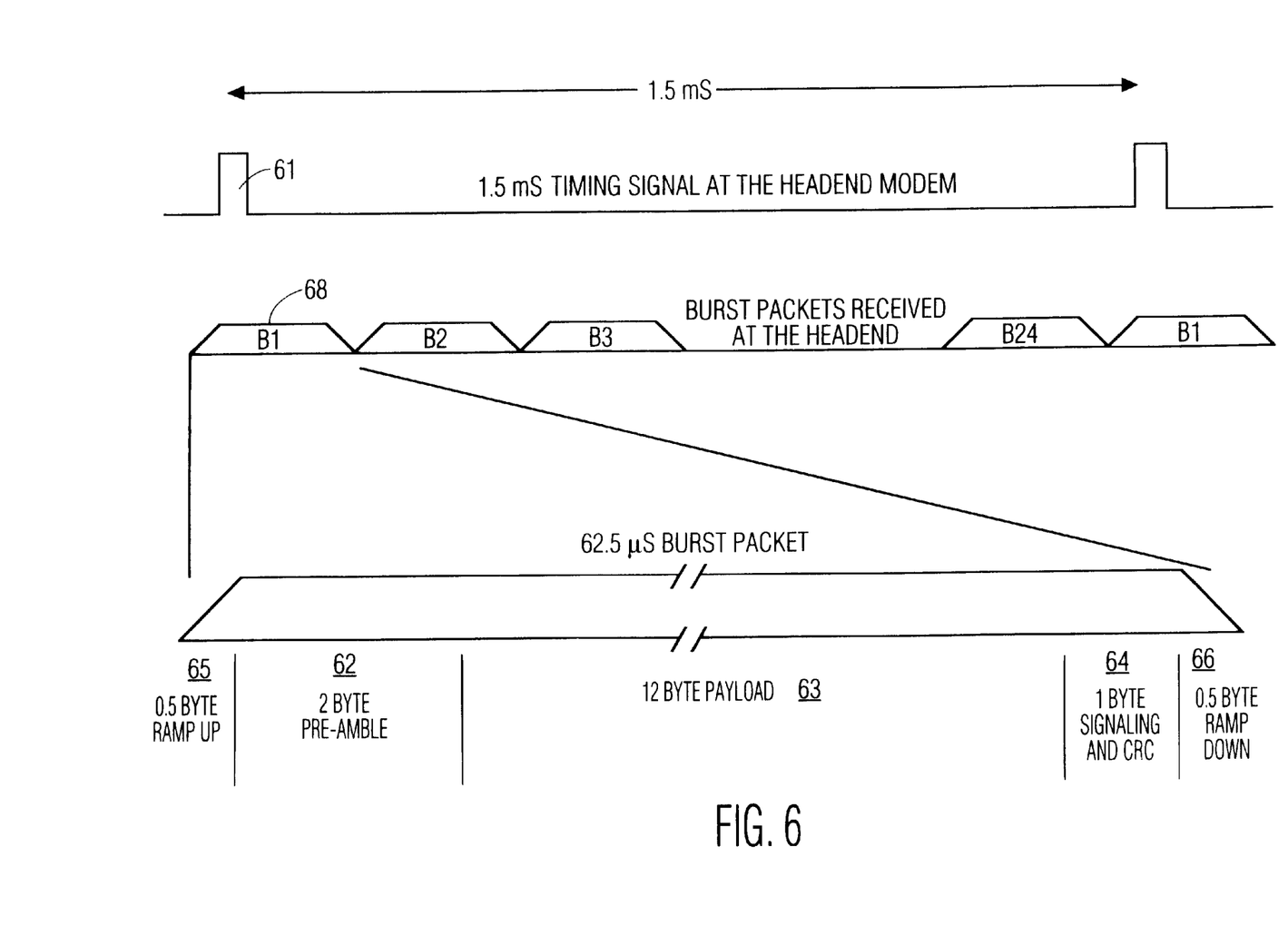
FIG. 6 shows the structure of the Upstream TDM transmission stream.

After this initial ranging of all NIU's 15 assigned to the CATV headend modem 27, normal transmissions commence. As shown in FIG. 6, in accordance with the preferred embodiment, the transmission from each NIU is specified to be 62.5 microseconds long, and comprises two bytes of preamble 62, twelve bytes of payload 63, and one byte of signalling and error correction 64. In this preferred embodiment, one byte length, in time, is allocated to allow for NIU variances, even though, ideally, all variance will have been eliminated by the setting of each NIU's delay as described above. This gap is shown in FIG. 6 as a half byte gap at the beginning 65 and end 66 of the transmission. This gap allows one transmitter to be late by a half byte, and the next to be early by a half byte, and still not interfere with each other. The total time allocated to each transmitter is thus 16 byte lengths, and the total variance allowed is a half byte. In this preferred embodiment, therefore, each transmitted message will arrive at the CATV headend within two microseconds (62.5 microseconds/16*2 half bytes=1.95 microseconds) of the start of its allocated time interval, regardless of the transmitter's distance from the CATV headend.

In the preferred embodiment, for efficiency, the headend modem utilizes the timing sequence established for the downstream, 1.5 millisecond, superframe to synchronize the upstream transmissions. This 1.5 millisecond period allows for twenty four 62.5 microsecond timeslots for the NIU transmissions. As discussed previously, each NIU could have one or more timeslots. The CATV headend transmits a timing signal 61 as part of the downstream signal 45 at each 1.5 ms superframe, as shown in FIG. 6. Each NIU transmits its upstream messages during its assigned time slot(s), relative to this timing signal plus the NIU's assigned internal delay. That is, for example, if an NIU was assigned a delay of twenty microseconds and assigned slots four and thirteen, it would transmit its first and second messages 207.5 microseconds (20+(4-1)*62.5) and 770 microseconds (20+(13-1)*62.5), respectively, after its decoded time reference.

In addition to the time efficiency provided by this invention, the assignment of a specific delay to each NIU to assure a consistent arrival time at the CATV headend also provides for effective and efficient error and noise detection. As discussed above, the NIU transmits a two byte preamble 62 with each packet 68. In the preferred embodiment, this preamble contains a known pattern. The CATV headend can compare the contents of the received preamble to the known pattern at the precise time that it should be received to determine both content errors as well as timing errors. This error checking can be performed without preprocessing, because both the time and form of the signal are predefined.

A significant deviation in the time of arrival of the packet could also be used as a means for detecting a bogus NIU, an NIU which may have been added after the network was initialized, and which is attempting to access, without authorization, the services provided by the network. Unless the bogus NIU determines the precise delay time required on this particular network, relative to the longest delay path on the network and its delay path to the headend, its packets will not arrive at the headend at the proper time. An improperly timed message can flag either a problem on the network, or an unauthorized user of the network.

The foregoing merely illustrates the principles of the invention. It will thus be appreciated that those skilled in the art will be able to devise various arrangements which, although not explicitly described or shown herein, embody the principles of the invention and are thus within its spirit and scope.

What is claimed is:

1. A receiver for receiving packets of telephony and data signals on a network from multiple transmitters, wherein each transmitter comprises adjustment means for adjusting the start time of transmission of packets, said receiver comprising:

means for communicating from the receiver to each transmitter, means for generating a synchronizing pattern and communicating said synchronizing pattern to each transmitter, means for measuring a packet arrival time of each packet from each transmitter, said packet arrival times being measured relative to the communication of said synchronizing pattern to each transmitter, means for identifying a latest packet arrival time which is at least as large as any other packet arrival time, means for determining a delay factor for each transmitter, each of said transmitter delay factors being dependent upon the packet arrival time from the corresponding transmitter, wherein each transmitter is characterized as having a location on said network, and wherein each transmitter delay factor is determined by the difference between the packet arrival time from the corresponding transmitter and said latest packet arrival time, each adjustment means is dependent upon a second communication from said receiver, each of said second communications to each transmitter is dependent upon the corresponding transmitter delay factor, and each adjustment means at each transmitter is such that packet arrival time of subsequent packets at the receiver is independent of the location of the transmitter of said subsequent packets.

2. A receiver for receiving packets of telephony and data signals on a network from multiple transmitters, wherein each transmitter comprises adjustment means for adjusting the start time of transmission of packets, said receiver comprising:

means for communicating from the receiver to each transmitter, means for generating a synchronizing pattern and communicating said synchronizing pattern to each transmitter, means for measuring a packet arrival time of each packet from each transmitter, said packet arrival times being measured relative to the communication of said synchronizing pattern to each transmitter, means for identifying a latest packet arrival time which is at least as large as any other packet arrival time, means for determining a delay factor for each transmitter, each of said transmitter delay factors being dependent upon the packet arrival time from the corresponding transmitter and said latest packet arrival time;

means for comparing a packet arrival time to an allocated packet arrival time, and means for signalling a warning when said comparison exceeds a predetermined level, wherein each transmitter is characterized as having a location on said network, each adjustment means is dependent upon a second communication from said receiver, each of said second communications to each transmitter is dependent upon the corresponding transmitter delay factor, and each adjustment means at each transmitter is such that packet arrival time of subsequent packets at a receiver is independent of the location of the transmitter of said subsequent packets.

3. A receiver for receiving packets of telephony and data signals on a network from multiple transmitters, wherein each transmitter comprises adjustment means for adjusting the start time of transmission of packets, said receiver comprising:

means for communicating from the receiver to each transmitter, means for generating a synchronizing pattern and communicating said synchronizing pattern to each transmitter, means for measuring a packet arrival time of each packet from each transmitter, said packet arrival times being measured relative to the communication of said synchronizing pattern to said transmitter, means for identifying a latest packet arrival time which is at least as large as any other packet arrival time;

means for determining a delay factor for each transmitter, each of said transmitter delay factors being dependent upon the packet arrival time from the corresponding transmitter and the latest packet arrival time, means for comparing a packet arrival time to an allocated packet arrival time, and means for inhibiting the subsequent processing of the compared packet when said comparison exceeds a predetermined level, wherein each transmitter is characterized as having a location on said network, each adjustment means is dependent upon a second communication from said receiver, each of said second communications to each transmitter is dependent upon the corresponding transmitter delay factor, and said adjustment means at each transmitter is such that packet arrival time of subsequent packets at the receiver is independent of the location of the transmitter of said subsequent packets.

4. A method for use in a network comprised of multiple transmitters of packets and a receiver of said packets, wherein each packet is characterized as having a time of transmission from its transmitter, and a time of reception at the receiver, relative to a time reference established at said receiver, wherein said method is intended to establish a fixed pattern of reception times at the receiver, said method comprising the steps of:

communicating said time reference to each of said transmitters, transmitting a packet from each transmitter upon receipt of said time reference, measuring the time of reception of the packet from each transmitter, in relation to said time reference, subtracting each of said times of reception from a constant, thereby forming a difference parameter for each of said transmitters, said constant being at least as large as a largest time of reception from the measured times of reception from all the transmitters, communicating said difference parameters to each of said transmitters, adjusting the time of transmission of subsequent packets from each transmitter in dependence upon said communicated difference parameter.

* * * * *